United States Patent [19]
Blake

[11] Patent Number: 4,573,532
[45] Date of Patent: Mar. 4, 1986

[54] JACQUARD FLUID CONTROLLER FOR A FLUID SAMPLER AND TESTER

[75] Inventor: William R. Blake, Tulsa, Okla.

[73] Assignee: Amoco Corporation, Chicago, Ill.

[21] Appl. No.: 650,959

[22] Filed: Sep. 14, 1984

[51] Int. Cl.$^4$ .................. E21B 49/08; E21B 47/06
[52] U.S. Cl. ................... 166/264; 137/625.19; 73/153; 251/62
[58] Field of Search ............ 166/53, 64, 66, 240, 166/250, 264, 336; 175/59; 137/625.18, 625.19; 251/62, 63.4; 73/151, 152, 154, 155

[56] References Cited

U.S. PATENT DOCUMENTS

| | | | |
|---|---|---|---|
| 2,964,061 | 12/1960 | Rawson et al. | 137/625.18 X |
| 3,248,938 | 5/1966 | Hill et al. | 73/155 |
| 3,494,175 | 2/1970 | Cusick et al. | 137/625.18 X |
| 3,577,782 | 5/1971 | Aitken | 73/155 |
| 3,611,799 | 10/1971 | Davis | 73/155 |
| 4,497,369 | 2/1985 | Hurta et al. | 251/62 X |

Primary Examiner—Stephen J. Novosad
Assistant Examiner—John F. Letchford
Attorney, Agent, or Firm—Scott H. Brown; Fred E. Hook

[57] ABSTRACT

Disclosed is a Jacquard control system for controlling fluid flow within an apparatus such as a downhole tool. Such Jacquard control system includes at least one control member having a plurality of holes therethrough, the holes being arranged in a plurality of patterns cooperable with fluid passageways within the downhole tool. Each pattern of holes permits fluid flow within the downhole tool to carry out a desired function. Also included is a device to selectively adjust the position of the at least one control member relative to the fluid passageways to permit the fluid flow to carry out the desired functions. A downhole fluid sampler and tester is disclosed which includes a Jacquard control system, for withdrawing fluid from a subterranean formation; determining at least one property of the withdrawn fluid, such as EH, pH, temperature, pressure and resistivity, and, if desired, obtaining a sample of the withdrawn fluid.

30 Claims, 13 Drawing Figures

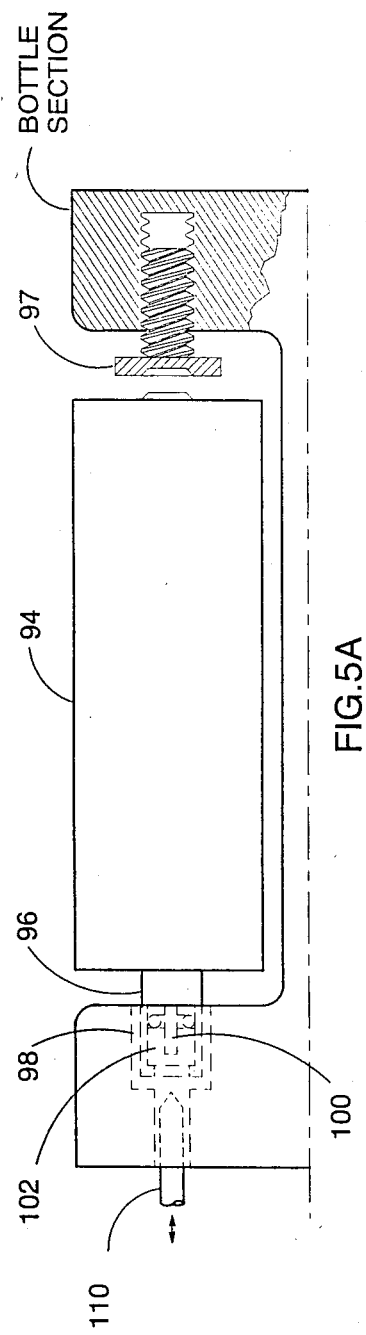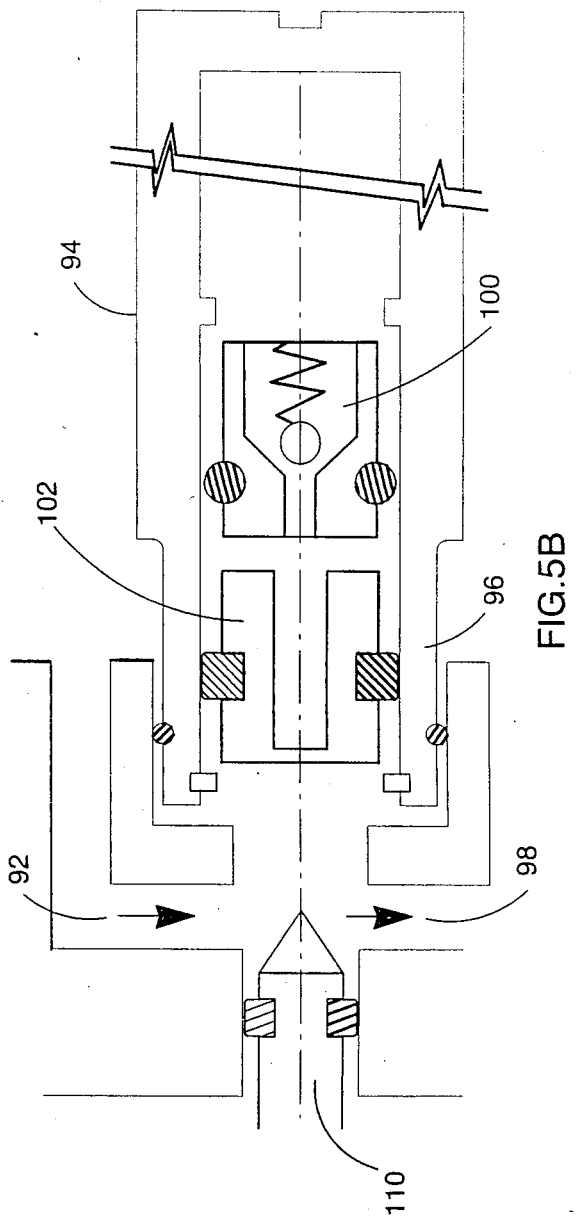
FIG.5A
FIG.5B

PACKER SECTION 168

PACKER SECTION 168

JACQUARD FLUID CONTROLLER FOR A FLUID SAMPLER AND TESTER

BACKGROUND OF THE INVENTION

1. Field of the Invention

The present invention relates to downhole tools, and, more particularly, to a Jacquard control system for controlling the routing of fluids into/out and within a downhole tool, such as a fluid sampler and tester.

2. Setting of the Invention

The use of fluid samplers and testers connected to a wireline to perform nondestructive collection and/or testing of fluid samples from subterranean formations is well known. Representative fluid sampling and testing tools are disclosed in U.S. Pat. No. 3,294,170 Purfurst; U.S. Pat. No. 3,577,783 Whitten; U.S. Pat. No. 4,416,152 Wilson; and "New Well Logging Tools Improve Formation Evaluation" IPE Journal, Sept. 10, 1979.

Previously, downhole tools have used electrically controlled solenoid valves to control the routing of fluids into/out and within the tool. The use of this type of valve has met with various degrees of success depending upon the complexity of the tool, as well as the tool's operating environment. One of the major problems with using this type of valve has been fouling of the valve by the corrosive and high-solids content borehole fluids. There is a need for a valving arrangement which prevents the occurrence of such fouling. As the benefits of using these tools has become more widely accepted the demand for fluid samplers and testers has grown. Various new tools have been developed which have increased capabilities and thus their internal fluid control complexity has grown. Working against this demand for increasing the functional capability of these tools is another demand that the overall outside diameter of these tools be reduced to enable the tools to operate in smaller diameter exploratory holes. As these tools have become more complex, it has become more difficult to package the fluid control valves and all of the necessary fluid piping within a smaller and smaller package. There is a need for a simple, rugged, small-sized fluid control mechanism for use within the downhole tool to control the routing of fluids into/out and within the downhole tool, and reduce the number of solenoid valves and the amount of tubing and pipe connections within the downhole tool.

SUMMARY OF THE INVENTION

The present invention is contemplated to overcome the foregoing problems and to meet the aforementioned needs. The present invention comprises a Jacquard control system for use in controlling fluid flow into/out of and within a downhole tool. The Jacquard control system includes two components. One component is at least one control member having a plurality of holes therethrough, the holes being arranged in a plurality of patterns cooperable with fluid passageways within the downhole tool. Each pattern permits fluid flow to carry out a desired function within the downhole tool. The other component is a device to selectively adjust the position of the control member relative to the fluid passageways to permit fluid flow to carry out the desired functions.

The Jacquard controller of the present invention is simple to construct, highly accurate in operation, and can be used in the severest wellbore enviroments. Embodiments of the present invention are designed to be useful in a very wide range of wellbore pressures, temperatures, solids content of the wellbore fluid, and the like. The present invention is particularly useful in a downhole tool which is capable of withdrawing fluid from a wellbore or from a subterranean formation; test such withdrawn fluid for various properties, such as EH, pH, resistivity, temprature and pressure; and, if desired, obtain a plurality of samples of such withdrawn fluid.

BRIEF DESCRIPTION OF THE DRAWINGS

FIGS. 5A and 5B are sectional views of one portion of the bottle section and one sample bottle.

DETAILED DESCRIPTION OF THE PREFERRED EMBODIMENTS

Figure 1:
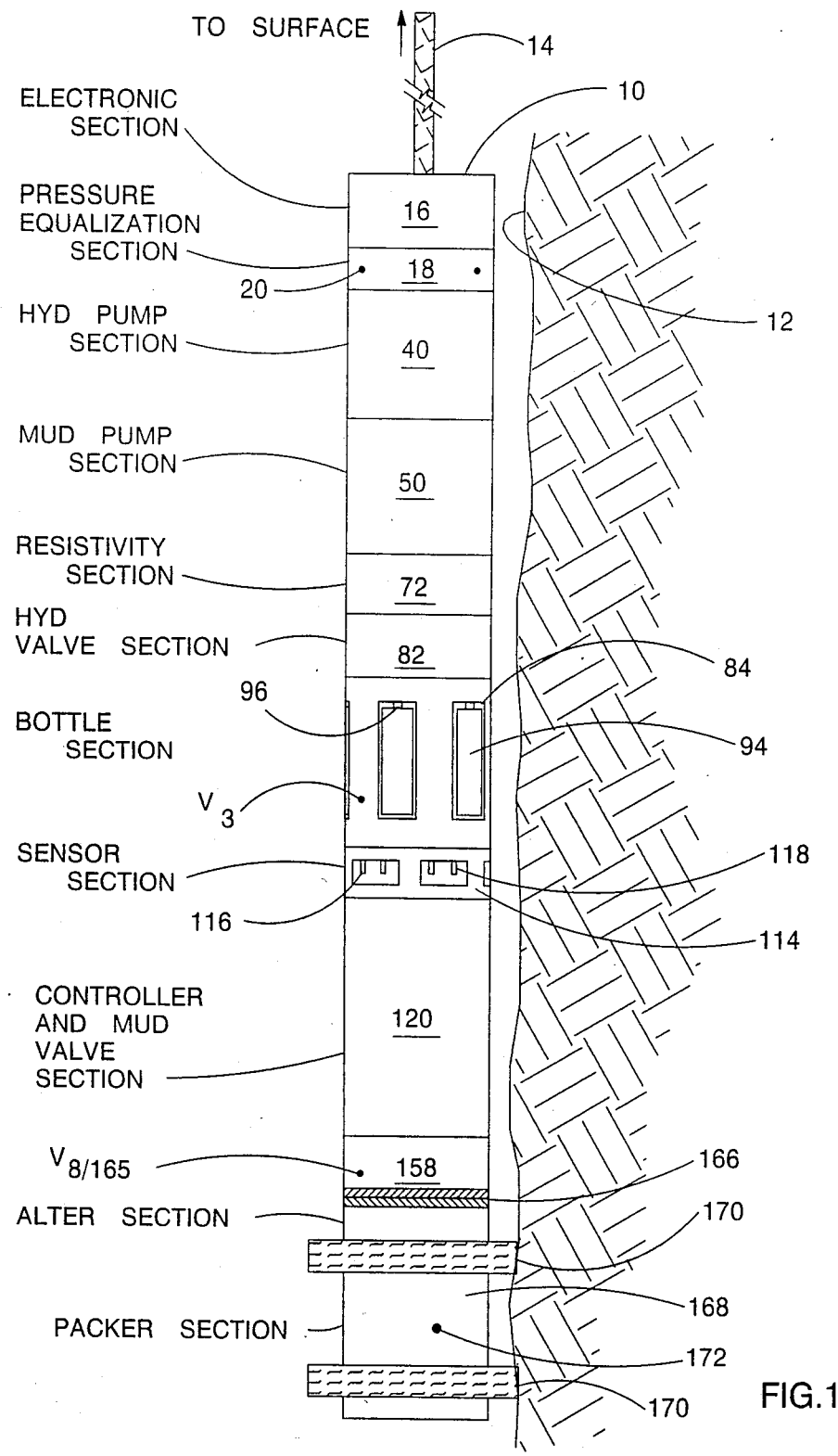
FIG. 1 is an elevational view of one embodiment of a downhole tool embodying the present invention suspended within a wellbore.

The present invention provides a Jacquard control system for use in a downhole tool. Such Jacquard control system includes two components. One component is at least one control member having a plurality of holes therethrough with the holes being arranged in a plurality of patterns cooperable with fluid passageways within the downhole tool. Each pattern of holes permits fluid flow within the downhole tool to carry out a desired function. The second component is a device to selectively adjust the position of the at least one control member relative to the fluid passageways to permit fluid flow to carry out the desired functions.

The Jacquard control system of the present invention will be described herein with special relation to downhole tools of the type to sample and/or test fluids within a borehole. However, the Jacquard control system of the present invention can be utilized in any other fluidic device or tool, including machining equipment and the like, as well as logging tools, resistivity tools, gamma ray tools, sidewall coring tools, and submarine and sea-floor controllers. The Jacquard control system can be used to control mechanical devices, electrical components, and fluid flow within a downhole tool; however, throughout the remainder of this discussion, the Jacquard control system will be described as controlling the flow of liquids into/out of and within the downhole tool.

As used herein, a Jacquard control system is a planar member having a plurality of holes therethrough with the holes arranged in a given pattern. An array of mechanical or electrical sensors or valve operators are passed across the surface of the planar member, or the planar member is moved relative to the sensors. The sensors detect the presence or absence of a hole and the pattern of such holes causes a certain function to occur or indicates a certain status. Examples of Jacquard control systems are those originally developed for the textile industry to control looms, player piano rolls, and computer punch cards. The inventor hereof known of no known downhole tool which utilizes a Jacquard control system to control the fluid flow into/out and within a downhole tool.

Also described herein is a downhole tool for testing fluid samples, and, if desired, obtaining and retaining the samples from a subterranean formation traversed by a borehole. The downhole tool comprises a body member for suspension within a wellbore; devices connected to the body member for withdrawing fluid from a subterranean formation; testing devices connected to the body member for determining at least one property of the withdrawn fluid; devices for providing an indication of the predetermined property to a remote location; and a Jacquard control system, as previously described.

Basically, the operation of an embodiment of the downhole tool of the present invention is as follows. Inflatable packers, usually mounted on the lowermost portion of the tool, are inflated to seal-off an interval within the borehole opposite a subterranean formation desired to be investigated. The fluid contained within the sealed-off interval is then pumped into the interior of the body member through an opening by a hydraulically operated mud pump. The withdrawn fluid is passed first through a filter and to a device that measures resistivity, and then is expelled to the borehole. An indication of the resistivity is sent through the tool's electronic section, usually mounted on the uppermost portion of the body member, and through a wireline or by other transmission methods to the surface to provide an indication of the resistivity to the operator. If, by viewing the indication of the resistivity of the withdrawn fluid, the operator determines that uncontaminated formation fluids are being tested, then fluid is withdrawn and routed to a sensor section, which provides an indication of the withdrawn fluid's properties, such as EH, pH, temperature, and/or pressure. Such indications are also transmitted to the surface. If the operator viewing the indicated property is of the opinion that the fluid withdrawn from the interval is to be sampled, then at least one of a plurality of sample bottles is opened to accept and retain a fluid sample. Any fluid not sampled is discharged out into the borehole, preferably outside of the interval which was packed off. After the desired number of samples has been taken and/or the properties have been measured as desired, the packers are deflated and the tool is then moved to a different location within the borehole and the process is repeated, if desired.

The Jacquard control system of the present invention controls the operation of a plurality of mechanically actuated valves, which are in communication with fluid passageways within the body member. The actuation of the valves, as determined by the positioning or orientation of a component of the Jacquard control system, permits the fluid to be withdrawn, tested, sampled, and discharged, as well as to be used to inflate the packers, as discussed briefly above.

The downhole tool embodying the present invention can be made in several different configurations. The particular embodiment of the present invention which will be described in detail below is illustrated in FIG. 1. This fluid sampler and tester is formed from a plurality of circular plates disposed concentrically within an elongated cylindrical housing or sonde. The embodiment can be used as a fluid sampler, without some or all of the fluid property testing devices; as a fluid tester, without the sample bottle section; or, preferably, both as a fluid sampler and tester.

As shown in FIG. 1, a body member or sonde 10 is suspended within a borehole 12 by a logging service wireline 14 or other cable-like systems, as is known to those skilled in the art. The body member 10 can be of any configuration with the separate components to be described hereafter connected thereto. However, preferably, for the purposes of maintenance and reliability of the components, all of the components are sealed within the body member 10. The body member or sonde can be formed from ceramic material, aluminum, steel, plastics, fiberglass, and the like and can be rigid or flexible. One embodiment of the body member 10 is formed from steel having a thickness of about ⅛ in. to about ¼ in. The thickness depends upon the type of material utilized, rigidity desired, as well as the expected wellbore environment. The inner and outer walls of the body member can be plated, treated, and/or coated to protect it from corrosion and abrasion. Preferably, the body member 10 is in the configuration of an elongated cylinder. If the body member 10 is to be conveyed through tubing, the outer surface can be provided with flow passages or "flutes" to ease the travel of the body member 10 through the interior of the tubing. In one embodiment of the present invention, the body member 10 is formed from heat treated and plated steel tubing having an inside diameter (ID) of 3⅝ in. and an outside diameter (OD) of 4⅜ in., and is about 24 ft in length. The body member 10 is designed to withstand external pressures of 6,000 psi but can be designated to withstand and operate successfully under pressures up to about 14,000 psi.

Figure 2:
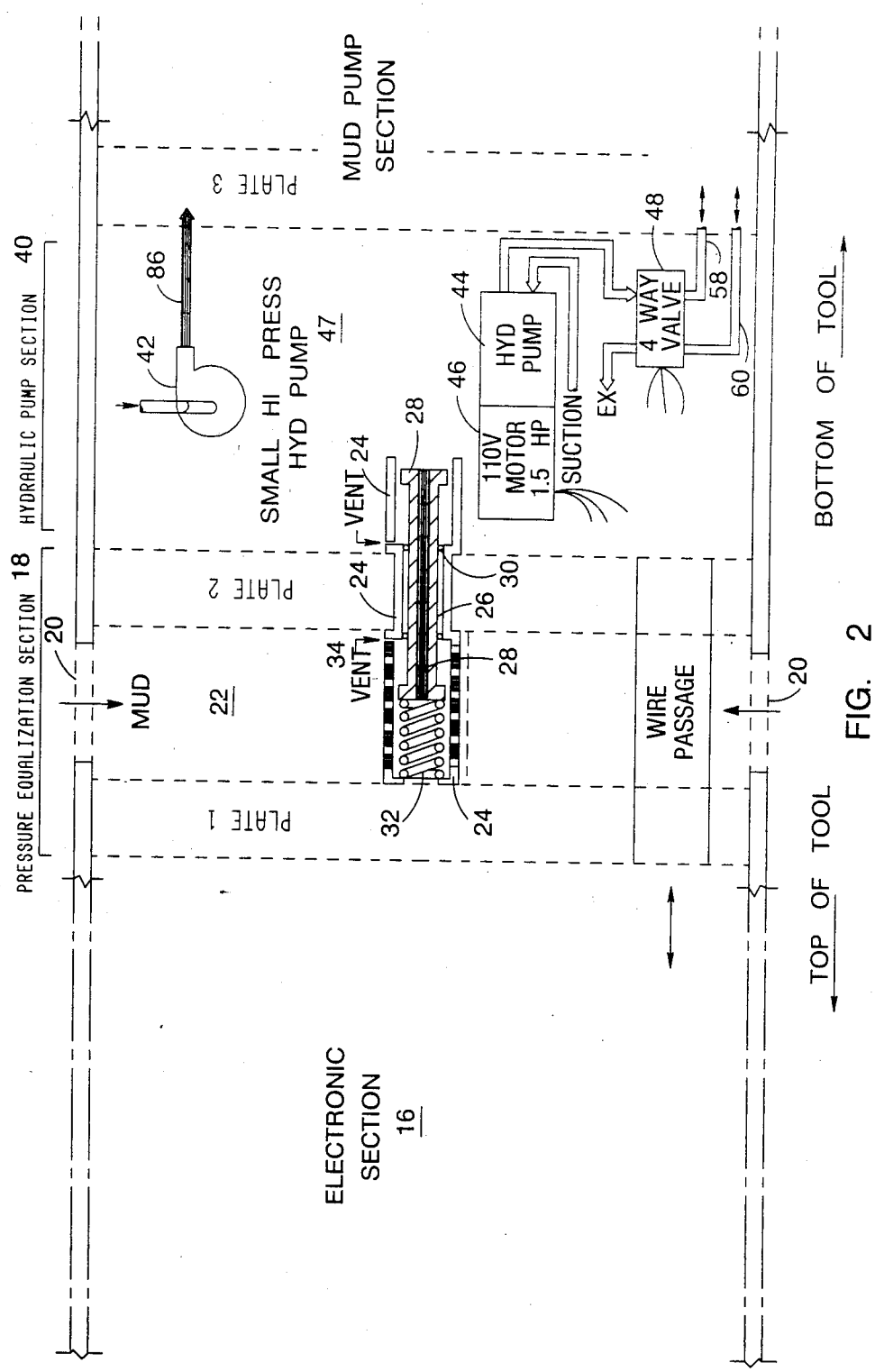
FIG. 2 is a semidiagrammatic representation of the pressure equalization section and hydraulic pump section of one embodiment of the present invention.

As shown in FIGS. 1 and 2, an electronic section 16 is included at the top most portion of the tool and is operatively connected to the wireline 14. The electronics section includes the necessary wiring and circuitry for performing the electronic control and information gathering/transmitting functions of the downhole tool. Specifically, in this embodiment, the electronics section 16 includes electrical circuitry to receive signals from the surface to activate and monitor electrically driven devices in the tool and for controlling the position or orientation of the Jacquard control system. Also, the electronic section includes circuitry for generating a signal representative of the desired fluid properties measured within the sensor section and resistivity section of the tool and transmitting these signals in the form of electrical pulses to the surface. Since a large number of electrical signals are being sent at any one time from the tool up the wireline 14, which is usually only 7 conductor cable, it is preferable that the signals to and from the tool be digitized and multiplexed.

The electronic section 16 can include the necessary equipment to send and receive signals via mud pulse, as is well known in the measurement-while-drilling (MWD) art. Also, the electronic section 16 can include the necessary equipment to send and receive signals via fiber optics, radio transmission, as well as combinations of electrical pulses, fiber optics, mud pulse and radio transmission, as desired.

The electronic section 16 can include, depending upon the features included in the tool, microprocessors and related circuitry to some degree automate the functions of the tool. For example, once activated, the electronic section could set the packers, withdraw fluid, test the fluid, and if such fluid has a property within a pre-programmed range then a sample will be taken. Then, an indication will be provided to the operator at the surface that another sample can now be taken if desired, else the packers will be released and the tool is ready for movement to another depth location.

In the shown embodiment, the next lower section is the pressure equilization section 18 which is provided to maintain a stable fluid pressure environment within the fluid filled portions in the body member 10. If the pressure of the fluids within the body member 10 are less than the pressure outside of the tool, then the body member 10 could be crushed or deformed which, due to the extreme close tolerances within the tool, could cause failure of some of the components within the tool. As shown in FIG. 2, the pressure equilization section 18 includes at least one vent or opening 20 in the exterior of the body member 10 to allow borehole fluid under ambient pressure to enter into the body member 10 and into a chamber 22 formed between Plate 1 and Plate 2. Disposed partially within the chamber 22 is a sliding piston assembly which acts as a pressure maintenance or fluid displacement device to maintain pressure equalization of fluids within and without of the body member 10, as described below.

The sliding piston assembly comprises a cylindrical sleeve 24 coaxial positioned with a bore or opening 26 in Plate 2. A piston 28 is adapted for reciprocal motion within the sleeve 24 and the opening 26. The opening 26 is provided with a plurality of sealing rings or O-rings 30 to prevent the passage of wellbore fluid from the chamber 22 into the interior of the body member 10. A spring 32 is coaxially connected to an upper end of the piston 28 and is disposed such that the piston 28, at ambient pressure, is approximately centered within the opening 26. When the pressure of the borehole fluid in the chamber 22 is greater than the pressure of hydraulic fluid within the interior of the body member 10, the borehole fluid enters at least one vent 20 and forces the piston 28 to move away from its centralized position towards the lower end of the body member 10. The hydraulic fluid within majority of the body member 10 is thus pressurized by the piston 28 to equalize the pressure between the borehole fluid within the chamber 22 and the hydraulic fluid within the interior of the body member 10.

As shown in FIG. 2, the next lower section in the tool is a hydraulic pump section 40 which includes an electric motor 41 connected to a hydraulic pump 42 which is preferably a high pressure, low volume pump; and a second hydraulic pump 44 driven by an electric motor 46, such as a 1 to 1½ horsepower motor. The motor 41 can have a rating of as low as 1/10 HP. The pumps 42 and 44 are mounted within a chamber 47 formed between Plate 2 and Plate 3. Both of the pumps 42 and 44 withdraw hydraulic fluid from within the interior of the body member 10 and are provided with electric power, through the electronic section 16, from the surface. Also included within the hydraulic pump section 40 is a four way solenoid valve 48 electrically operated by circuitry within the electronic section 16 for controlling the flow of hydraulic fluid from the pump 44, as will be described hereinafter.

The hydraulic pump 42 is utilized to control one portion of the operation of the Jacquard control system, and also, if included, a portion of the operation of the sample bottle section (described below).

The hydraulic pump 44 is utilized to drive a mud pump to withdraw fluid from the borehole or directly from the subterranean formation and provide such fluid to the packer section, the testing devices, the bottle section, and back to the borehole, as directed by the Jacquard control system (described below). Since the hydraulic pump 44 is utilized for such purposes, it is preferably a low pressure, high volume pump. Such a pump can have a flow rate of from about 3 to about 7 gallons per minute (GPM) at 300–400 psi. Due to the size constraints within the body member 10, the motor 46 and hydraulic pump 44 are of a diameter only slightly less than the interior diameter of the body member 10. The pumps 42 and 44 are preferably mounted coaxially within the body member 10 to reduce outside diameter requirements. If smaller tool diameter needs are imposed, then the motor 46 can be of a smaller diameter but longer to still have the same HP rating.

Figure 3:
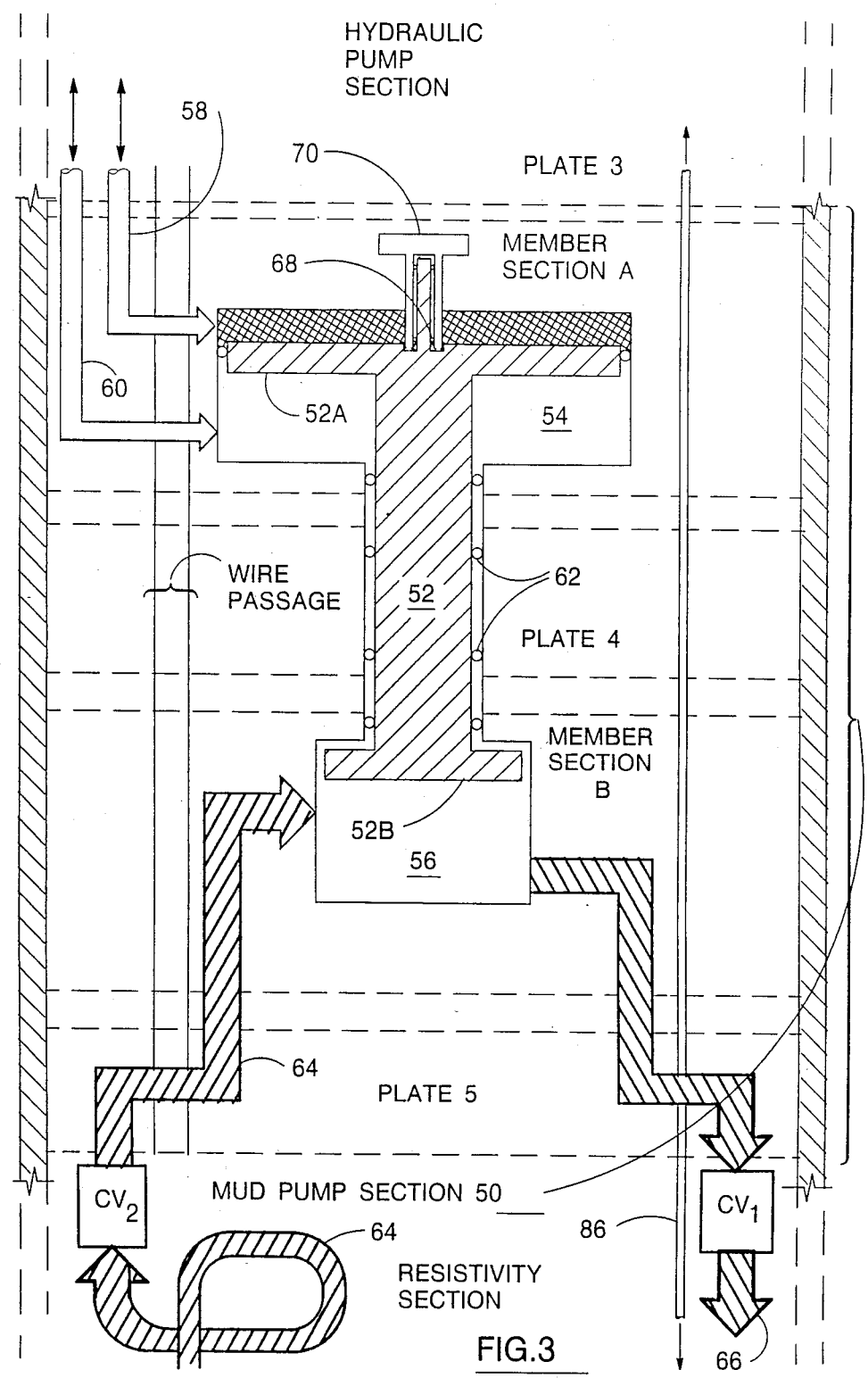
FIG. 3 is a semidiagrammatic representation of the mud pump section of one embodiment of the present invention.

As shown in FIG. 3, the next lower section is a mud pump section 50 formed by Member Section A, Plate 4, and Member Section B. The mud pump section 50 includes a piston 52 disposed for reciprocal movement within chambers 54 and 56 formed within Member Sections A and B, respectively. Hydraulic fluid from the hydraulic pump 44 passes through the four way solenoid valve 48 and through conduits 58 and 60 to the upper and lower faces, respectfully, of the upper portion 52A of the piston 52 within the chamber 54. Hydraulic fluid is provided through the conduit 58 to drive the piston 52 towards the lower end of the tool. The four-way control valve 48 is then electronically switched to exhaust hydraulic fluid through the conduit 58 and provide hydraulic fluid through the conduit 60 to drive the piston 52 towards the upper end of the tool, thus providing reciprocal motion. The piston 52 is provided with a plurality of sealing rings or O-rings 62 to prevent the communication of hydraulic fluid, within the chamber 54 with wellbore fluid in the chamber 56.

The movement of a lower piston face 52B within the chamber 56 provides the hydraulic force necessary for withdrawing the wellbore fluid from the borehole or subterranean formation and providing the withdrawn fluid to various portions of the body member 10, as will hereinafter be described. Fluid is drawn by the reciprocal motion of the piston 52B through a one way check valve $CV_2$ through a conduit 64 into the interior of the chamber 56 and then it is exhausted or pumped under pressure through a conduit 66 through a one way check valve $CV_1$ to another portion of the body member 10, as will be described hereinafter, to carry out the desired functions. In one embodiment, a 1¼ in. OD piston 52 driven by a 1½ HP pump 44 can provide suction approximately 350–400 psi below ambient pressure.

The separation of the hydraulic fluid chamber 54 from the mud chamber 56 assures that the hydraulic fluid will have a minimum chance of contamination from the bore-hole fluid, within the chamber 56, thereby further increasing the expected reliability of the operation of the downhole tool.

To provide an indication of the stroke or throw and the relative position of the piston 52 between the chambers 54 and 56, an electrical position indicating device is provided on an upper portion of the piston 52A. The device includes at least one finger member 68 which extends from an upper end of the piston 52A and is received in and/or around a housing 70. Wrapped around the housing 70 is a coil of wire 71 through which is provided a low voltage AC current from the electronic section 16. The low voltage AC current passing through the coil of wire 71 sets up an electrical field so that when the finger 68 is at its uppermost position (when the piston 52 is in its uppermost position) the measurement of the current through the coil 71 will be of one value. When the piston 52 is displaced to its lowermost position, then the finger 68 is almost outside of the housing 70, thus a measurement of the current will be of a different value. The electronic section 16 includes necessary circuitry to differentiate the two values such that at any point within the operation of the mud pump the electronic section 16 is provided with a signal representative of the relative position of the piston 52 within the chambers 54 and 56. Upon receipt of a signal value representative of the end points of piston travel, a signal is provided electronically to the four way valve 48 so that the piston 52 is continually reciprocated within the chambers 54 and 56 without stalling.

Figure 4:
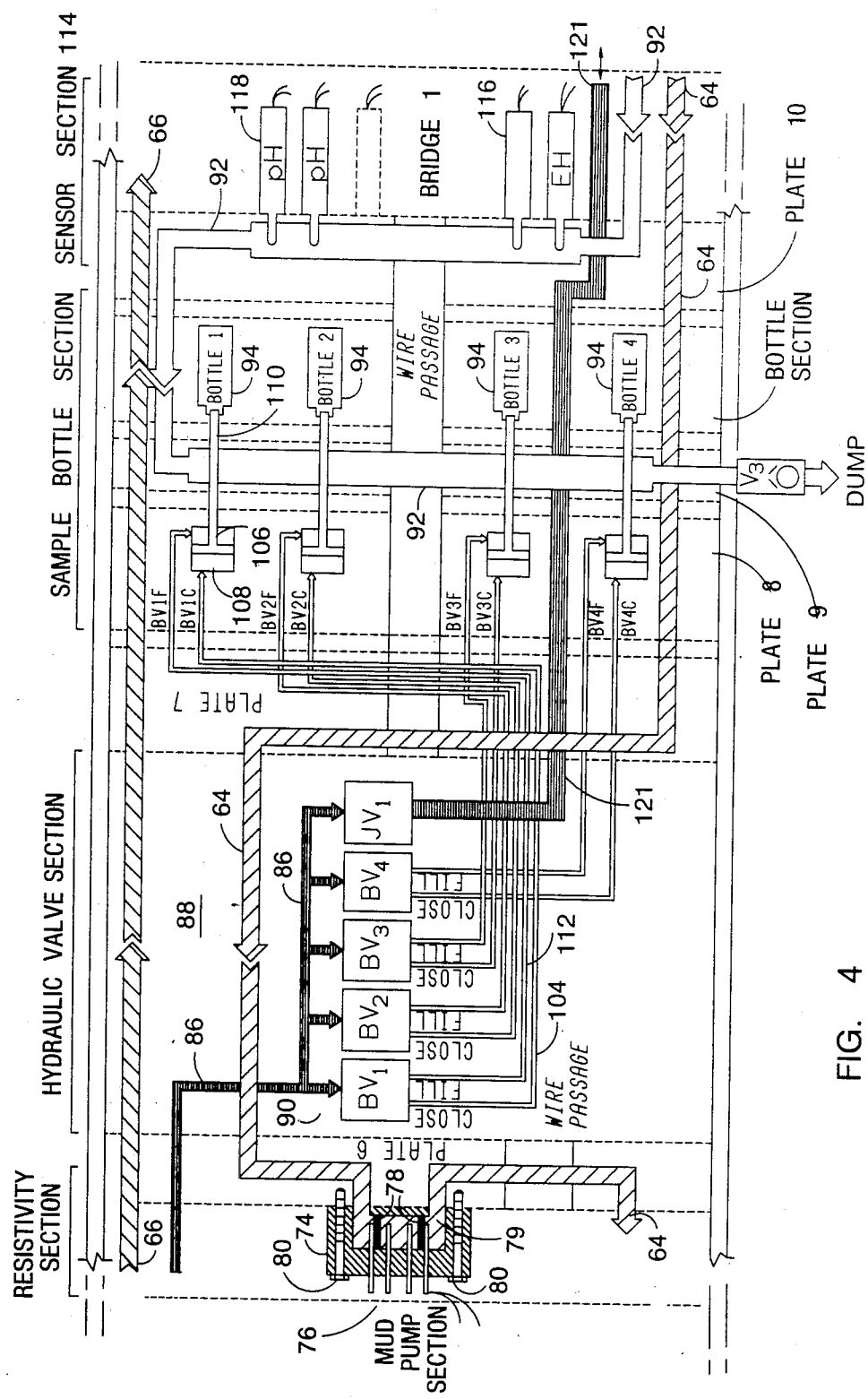
FIG. 4 is a semidiagrammatic representation of the resistivity section, hydraulic valve section, bottle section, and sensor section of one embodiment of the present invention.

As shown in FIG. 4, the next lower section of the shown embodiment is a resistivity section 72, disposed within a chamber formed between Plate 5 and Plate 6. The resistivity section 72 provides an indication of the electrical resistivity of fluids passing through the conduit 64, through the electronic section 16 to the operator at the surface. A probe housing 74, made of a nonconductive material, such as nylon, includes a plurality of anode and cathode probes, generally shown by reference numeral 76, which contact metal resistivity screens 78 disposed across a chamber 79 in the housing 74. The housing 74 is removably mounted by way of screws 80 to Plate 6 for ease of changing worn or damaged probes 76 and filters 78.

As shown in FIG. 4, the next lower section is the hydraulic valve section 82. High pressure hydraulic fluid from the pump 42 passes through a conduit 86 to a plurality of valves, labeled $BV_{1-4}$ and $JV_1$. The valves $BV_{1-4}$ and $JV_1$ are disposed in a chamber 88 formed between Plate 6 and Plate 7, and are electrically operated solenoid valves. For ease of understanding of the operation of the hydraulic valve section 82, the sample bottle section 84 will be next described. In the sample bottle section 84, fluid is provided by the operation of the mud pump 50 through a conduit 92, past a plurality of openings (not shown) in communication with a plurality of sample bottles 94, and the fluid is then vented through a one way check valve $V_3$ to the exterior of the body member 10. As shown in FIGS. 5A and 5B, a sample bottle 94 is removably, but rigidly, carried externally on the body member 10, for ease of removal and replacement. Each sample bottle 94 includes a hollow interior chamber and a gasketed or threaded throat section 96, which is receivable into and releasably maintained by a thumb screw 97 within a chamber 98 in the bottle section 84. Included within the threaded throat portion 96 of the bottles 94 is a one-way check valve 100 which prevents the escape of fluid once it has entered into the interior of the bottle 94. A rupturable or puncturable rubber or metal seal 102 is mounted across the mouth of the throat section 96. The bottles 94 are preferably in an evacuated state upon connection to the body member 10 and when the seal 102 is broken (as described below), fluid is drawn into the bottle 94 and maintained therein under ambient reservoir pressure by the valve 100.

The sample bottles 94 are preferably formed from a chemically nonreactive material, such as stainless steel, or are coated and/or plated to be so. The sample bottles 94 can be of any particular configuration but in this embodiment are preferably cylindrical in shape and have an interior fluid capacity of about 100 to about 150 milliliters (ml).

When it is decided that a sample of fluid passing through the conduit 92 is to be taken, current through the electronic section 16 is provided to a selected valve ($BV_{1-4}$). For example, for Sample Bottle 1, $BV_1$ is switched so that hydraulic fluid under pressure from pump 42 will pass through a conduit 104 to move a small piston 106, disposed for reciprocal movement in a chamber 108 formed in Plate 8. The piston 106 is provided with an elongated and pointed pin 110 which breaks the rupturable seal 102 to allow the vacuum within the bottle 94 to draw in fluid, past the one-way check valve 100. Fluid pressure in conduit 92 can be elevated above the ambient pressure of the wellbore by any amount up to about 350 psi by means of adjusting the vent valve $V_3$ to provide back pressure. After the puncture of the seal 102, the electronic section 16 electronically switches the valve $BV_1$ to force hydraulic fluid through conduit 112 to withdraw the piston 106 and pin 110. The taking of fluid samples with the rest of the bottles 94 is the same as described. The first fluid sample is preferable taken at the greatest depth so that subsequent samples will have lesser interior pressure, thereby assuring that the check valves 100 on the earlier sampled bottles will remain sealed.

As a safety measure in the event that a sample has already been obtained and $BV_{1-4}$ is inadvertently activated, the pins 110 extend no further than the approximate position of the seals 102 and do not activate the needle valves 100. Thus, a previously obtained sample will not be inadvertently released.

As shown in FIG. 4, the next lower section is the sensor section 114 formed by Bridge 1 and Plate 10, wherein fluid is withdrawn by operation of the mud pump 50 through the conduit 92 and past at least one EH probe 116 and pH probe 118. Sufficient space is provided in the sensor section 114 for additional probes, which can be used to measure fluid flow rate, temperature and pressure if desired. The probes 116/118 are releasably mounted to the Bridge 1 by eccentric bolts, for ease of changing.

Figure 6:
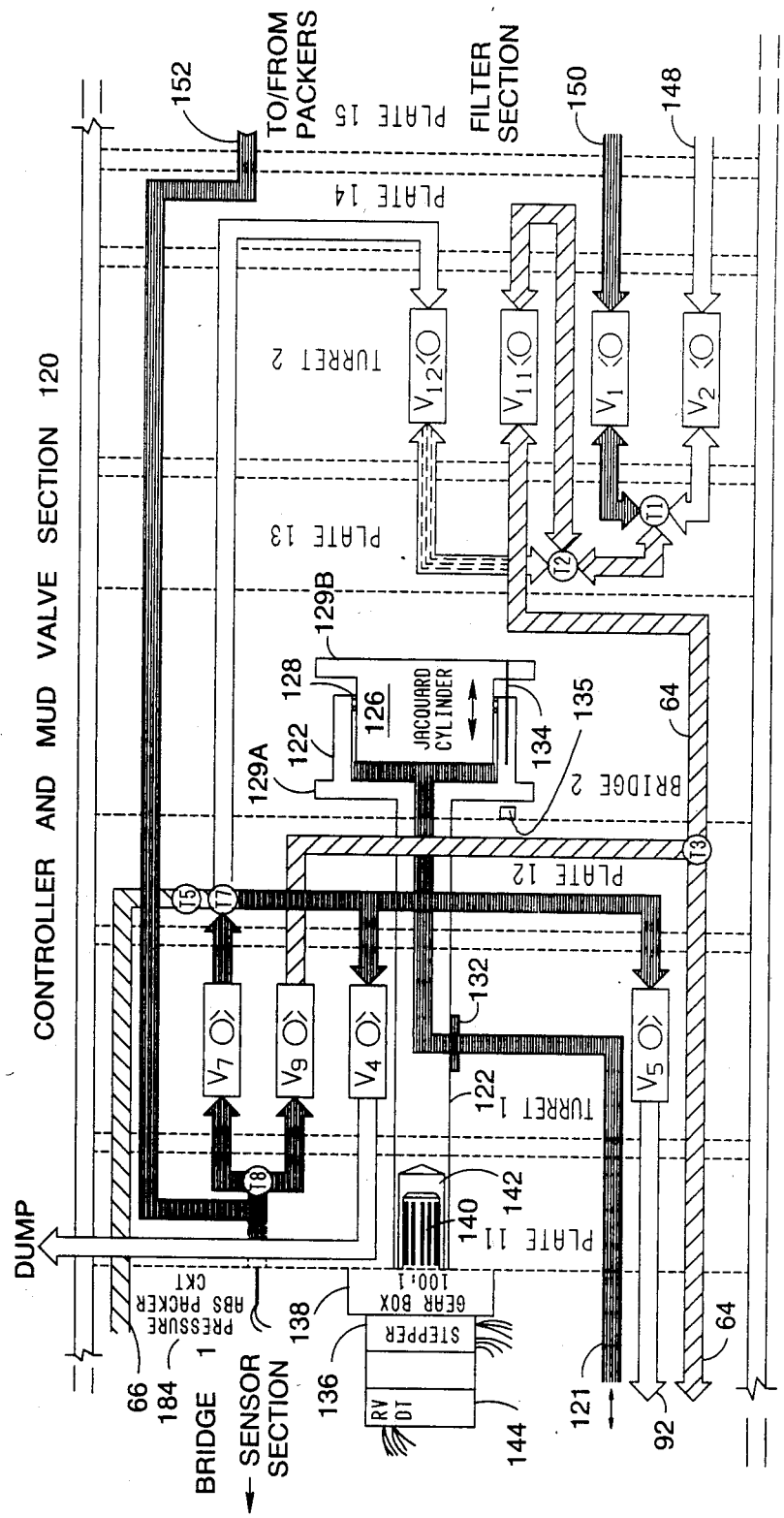
FIG. 6 is a semidiagrammatic representation of the control and mud valve section of one embodiment of the present invention.
Figure 7A:
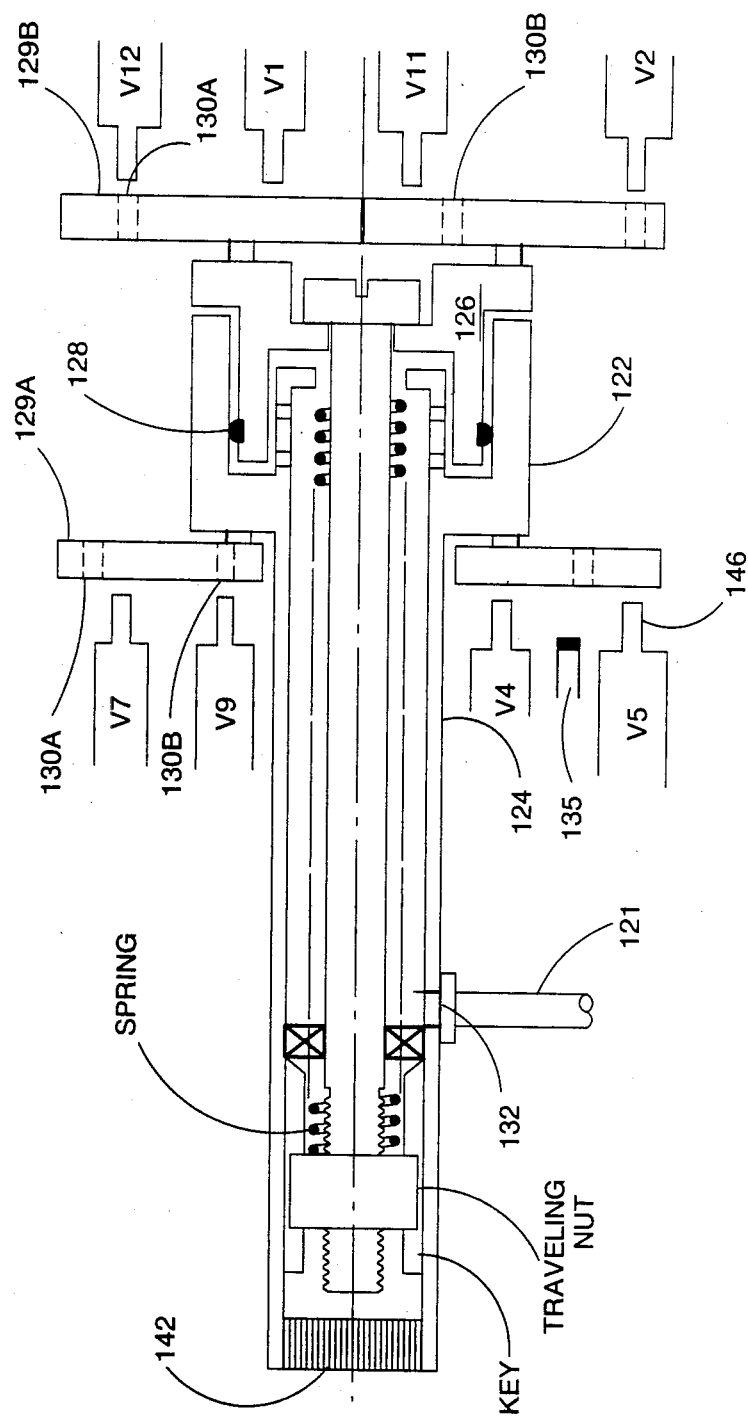
FIG. 7A is a side view of one embodiment of the Jacquard control system of the present invention.

As shown in FIGS. 6 and 7, the next lower section is the controller and mud valve section 120 which includes the Jacquard control system. Hydraulic fluid from the pump 42 passes through conduit 86 and then through the three-way solenoid valve $JV_1$ and into conduit 121 into a component of the Jacquard control system. In this embodiment, the Jacquard control system comprises a rotatable hollow cylinder 122 provided with a coaxial hollow extension 124 and a piston 126, adapted for reciprocal motion within the cylinder 122. The piston 126 is provided with a plurality of sealing rings or O-rings 128 to prevent the leakage of high pressure hydraulic fluid. Both the cylinder 122 and the piston 126 can be provided with coaxial, perpendicularly mounted circular plates or control members 129A and B, respectively. As shown in FIG. 7, the control members 129A and B are provided with a plurality of holes therethrough, 130A and B which are arranged in a plurality of patterns cooperable with fluid passageways in Plates 11, 12, 13, and 14 and valve Turrets 1 and 2 (as will be described hereinafter). The holes 130A are a given distance from the central axis of the control members 129A and B and the holes 130B are a lesser distance from the central axis of the control members 129A and B.

In other embodiments, both control members or plates may not be needed and only one control member or plate may be mounted to either the cylinder 122 or the piston 126, as desired.

The extension 124 is provided with a slidable seal 132 for connection of the conduit 121 into a hollow interior portion of the extension 124. Hydraulic fluid from valve $JV_1$ is introduced into the cylinder 122 and moves the piston 126. Both the cylinder 122 and the piston 126 are free floating so both move when hydraulic fluid is introduced. To keep the proper axial orientation of the control members, an alignment pin 134 extends within a bore (not shown) in the cylinder 122 and into a bore (not shown) in the control member 129B. A block 135 of adjustable length extends downward from the Plate 12 and into Bridge 2. The block 135 is positioned adjacent the control members 129A/129B, and provides a fixed point from which either control member 129A/129B can push from or pull to to expand or contract.

As shown in FIG. 6, the extension 124 is journaled within Plates 11 and 12 for rotary movement about the longitudinal central axis of the body member 10. Rotary movement of the control members 129A and B is provided by an electrical stepper motor 136, which can be connected to a gear reduction box 138. A spline connection 140 on the motor 136 or the gear reduction box 138 is insertable in and cooperable with a splined bore 142 in an upper end of the extension 124. The stepper motor 136 provides precise movement around the central longitudinal axis of the body member 10 in a predescribed number of degree increments. In the embodiment shown, such increments are 25° apart and the extent of travel is an arc of about 175°. The stepper motor 136 is also provided with a feedback circuit device 144 in connection with the electronic section 16 to provide an indication to the operator of the exact axial or rotary position of the cylinder 122 and the piston 126, relative to a predetermined zero position.

Figure 7B:
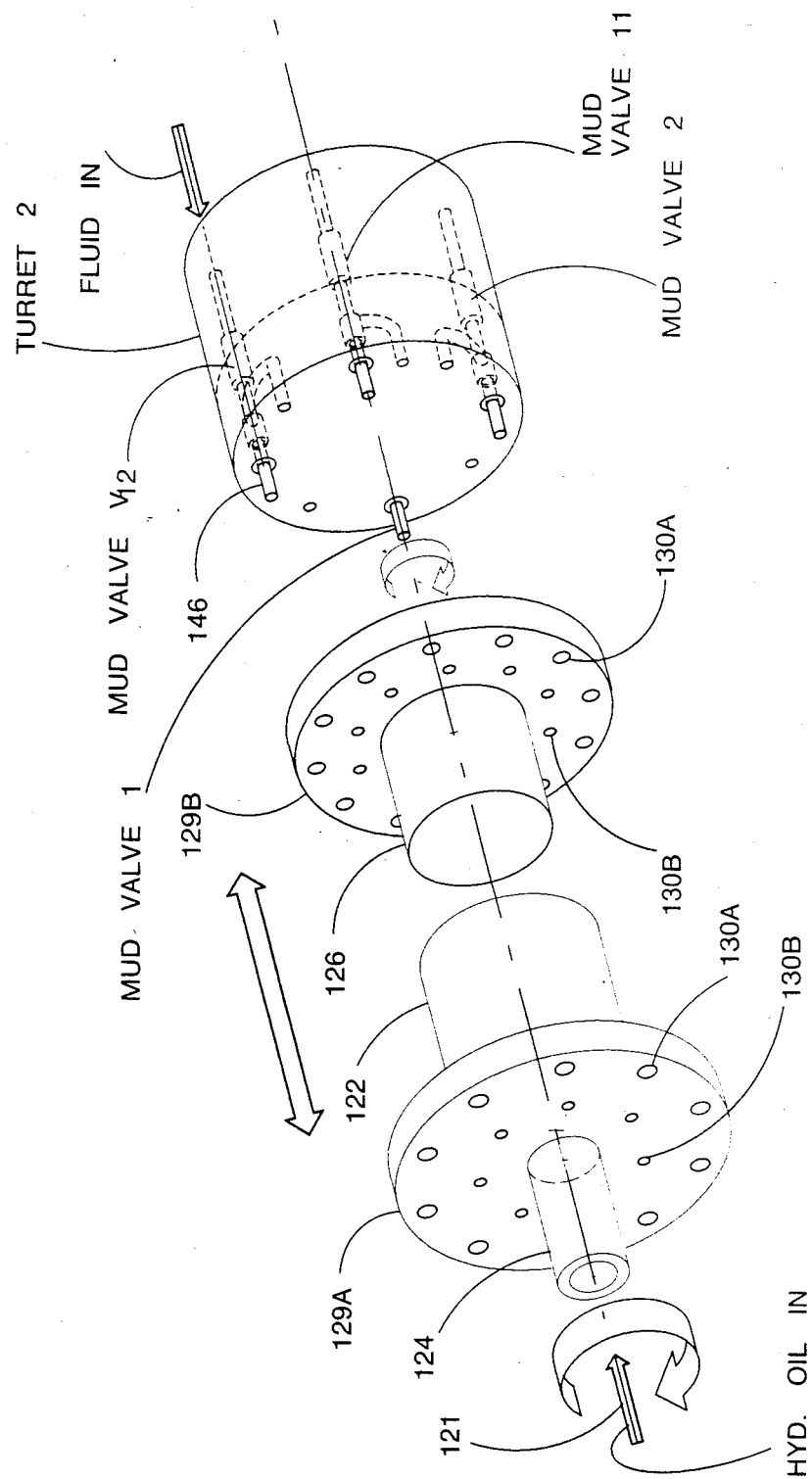
FIG. 7B is a perspective view of one embodiment of the Jacquard control system of the present invention.

Each 25° increment of rotation of the cylinder 122 and piston 126 moves the control members 129A and B from one functional position to another. As shown in FIGS. 6 and 7B, a plurality of mechanically actuated valves, normally open or, in this embodiment, preferably, closed valves are provided in two groups ($V_{4,5,7,9}$ and $V_{1,2,11,12}$) immediately adjacent and parallel with the control members 129A and B. Each of these valves are provided with an elongated valve stem 146 which protrudes outwardly and adjacent the control members 129A and B. The valve stems 146 are of a smaller outside diameter than the interior diameter of the holes 130A and B. When the control members 129A and B are expanded, by the introduction of hydraulic fluid into the cylinder 122 pushing on the piston 126, the valve stems 146 which are aligned with certain holes 130A or B, pass through the holes and will not be actuated. However, those valve stems 146 connected to certain valves that are not aligned with holes, will be depressed by the expansion movement of the control members 129A and B. When such valve stems 146 are depressed, the valves are opened thereby allowing fluid flow through the valves and outwardly through fluid passageways in manifold plating (Plates 11, 12, 13, and 14) to carry out a desired function within the tool. Each 25° rotation by the stepper provides or displays a separate pattern of holes to the valves such that a separate desired function within the downhole tool can be carried out, as will be described hereinafter.

All of the valves ($V_1$, $V_2$, $V_4$, $V_5$, $V_7$, $V_9$, $V_{11}$ and $V_{12}$) are spring loaded and adjustable to serve as normally closed two-way valves. The spring bias of the valves can be adjusted to slightly exceed the maximum and minimum differential pressure expected to be encountered in the operation of the tool.

It should be understood that other embodiments of the Jacquard control system can be utilized within the present invention and not just an expanding piston and cylinder assembly. Another embodiment can include plates having a plurality of holes therethrough moving in juxtaposition one to another to allow fluid flow from fluid passageways opposite both sides of the plates or fluid passageways opposite just one of the plates with the movement of the plate between sealing devices to allow fluid flow or prevent fluid flow through certain of the fluid passageways to carry out a desired function within the downhole tool. Also, because of the corrosive and abrasive nature of the fluids passing through the tool, it is found that a system which isolates hydraulic fluid from the actual controlling members and surfaces, as in the present invention, is preferable. In the present invention, all withdrawn fluid passes through the mud valves, but in no way contacts the operable or sensitive portions of the Jacquard control system.

Figure 8:
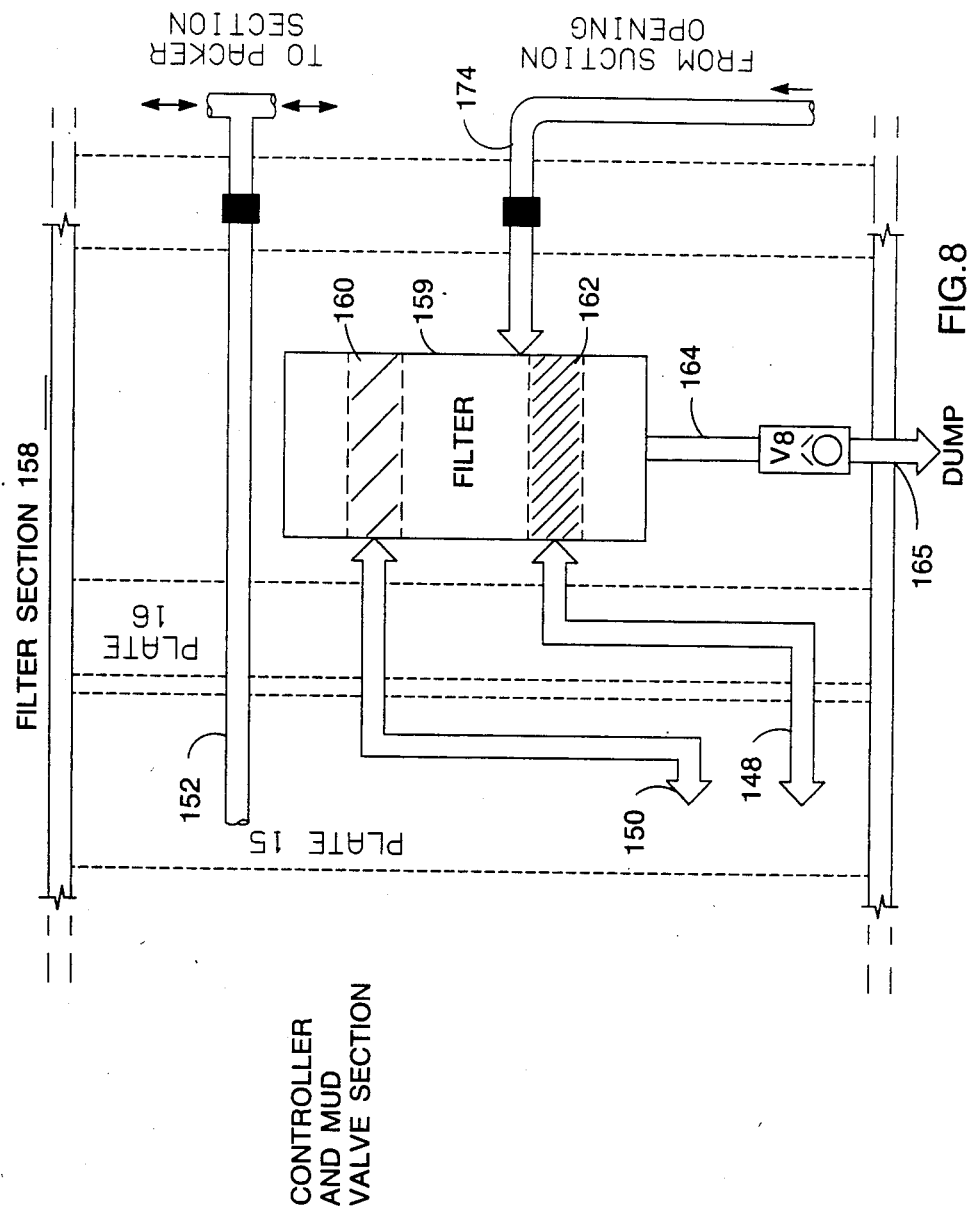
FIG. 8 is a semidiagrammatic representation of the filter section of the present invention.

As shown in FIGS. 6 and 8, the next lower section is a filter section to filter out drilled solids from the withdrawn fluid. Three fluid conduits: conduit 148 to and from valve $V_2$; conduit 150 to and from valve $V_1$; and conduit 152 to and from T connection $T_8$ (in communication with both valves $V_7$ and $V_9$) pass to a filter section 158. At least one but preferably at least two filters, such as a coarse filter 160 and a fine filter 162, are included in a housing 159. Withdrawn fluid can pass through both the fine and the coarse or either filter, as determined by the operation of the valves $V_1$ and $V_2$. A conduit 164 extends from the filter housing 159 through a one-way check valve $V_8$ to a vent 165 in the body member 10. The filters can be screens or elongated multielement filters.

Figure 9A:
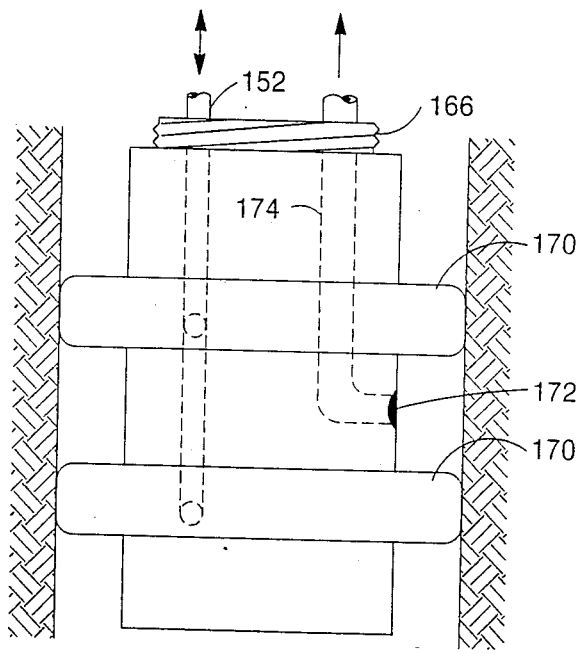
FIGS. 9a and 9b are alternate embodiments of the packer section of one embodiment of the present invention.
Figure 9B:
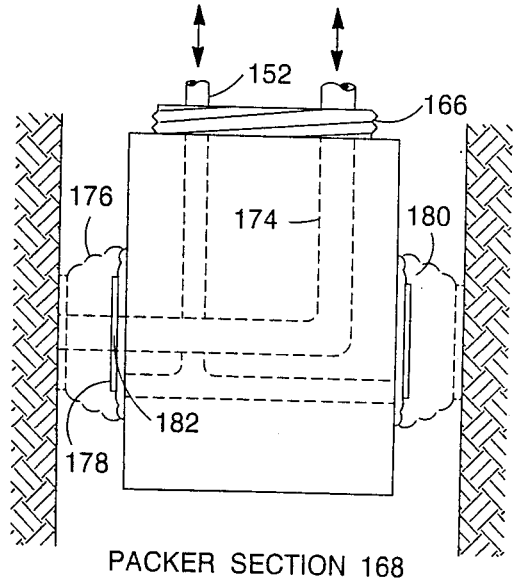

As shown in FIGS. 9A and 9B, a packer section 168 is connected to a lower end of the filter section 158 through a threaded or other removable connection 166. In the embodiment shown in FIG. 9A, the packer section 168 includes at least one rubber torroidal, expandable packer 170, for engagement with the borehole surface. Two spaced packers 170 can be utilized to isolate a short interval of the wellbore, for example about 6 in. to 1 ft, if desired. The packer(s) 170 are inflatable or expandable by injection of fluid provided through conduit 152, which is provided with a removable conduit connection 171. An opening 172 is provided for the passage of fluids into the body member 10 into a conduit 174, which is in communication with the interior of the filter housing 159, through a removable conduit connection 171.

In the embodiment shown in FIG. 9B, the packer section 168 is provided with an expandable boot or bellows 176 which when inflated pushes a suction plate 178 into releasable engagement or sealing contact with the borehole surface. Also, a guide shoe 180 or the like can be expanded into contact with an opposite side of the borehole surface by way of fluid pressure from the conduit 152 to help press the plate 178 against the formation face. Upon actuation of certain valves by the Jacquard control system, the mud pump then withdraws fluid through an opening 182 in the plate 178 and passes the fluid through the conduit 174. Such embodiment shown in FIG. 9B can be useful for obtaining porosity and permeability checks.

Also, the packer section 168 can be in the form of a downwardly extended two part sleeve connected together by a rubber bladder. Upon injection of the fluid, under pressure from the mud pump, the bladder is expanded into contact with the borehole surface, thus raising or shortening the lower part of the sleeve. This configuration can be used for packing off larger boreholes, such as from 7 in. ID to about 12 in. ID.

In both of the embodiments shown in FIGS. 9A and B, and immediately discussed, the packing elements, plates, shoes and the like are mounted within recesses (not shown) so that the exterior diameter of the packer section 168 is no larger than the body member 10.

At least two pressure transducers can be used within the tool to read the suction pressure and absolute pressure. In the embodiment shown in FIG. 6, a pressure transducer 184 is located at T-connection $T_8$ and on the face of Plate 11. Both of these pressure transducers read absolute pressure, that is the gravity head of the fluid in the wellbore minus the pumping pressure. By summing the two pressure readings, the operator at the surface can be able to determine the differential pressure imposed on the packers. Also, by reading the pressure from the transducer 184 on the face of Plate 11, the operator can be provided with an indication that the tool is within an overpressure zone, or that formation fluid is being withdrawn rather than wellbore fluid.

Pressure transducers can be mounted to the exterior of the packer section 168 above, below and between the packers 170 (FIG. 9A), as well as above and below the plate 178 and within the conduit 174 (FIG. 9B). The pressure transducers can be electronically connected to the electronic section 16, and can be used to measure the pressure of the wellbore fluids above and below the packers and the amount of suction or drawdown the mud pump is able to provide as measured within the conduit 174 or between the packed-off interval. These pressure readings can then be used in determining characteristics of the subterranean formation as is well known by those skilled in the art.

There is a need to obtain and retain fluid samples in an uncontaminated state and under ambient reservoir pressures. The obtainment of such samples can greatly increase our knowledge of geochemistry and how the earths fluid, such as hydrocarbons, geothermal waters, connate waters, and brines, move or how they were formed. The inventor of the present invention knows of no downhole tool which is capable of testing and sampling fluids, returning such samples in an uncontaminated state and under ambient reservoir pressure, and including a Jacquard control system.

Wherein the Jacquard control system described herein has been described as controlling all of the functions relating to fluid flow, it should be understood that the Jacquard control system can be used to control one or more of the functions and other control devices, such as electrically operated solenoid valves can be used to control the remaining functions.

For ease of understanding of the present invention, a systematic description of the operation of the tool will be described hereinafter. If FIGS. 2, 3, 4, 6, 8 and 9 are laid end-to-end, the operation of the tool will be easier to understand.

At the surface, the operator can mount as many sample bottles 94 as is desired into the Bottle Section. As previously described, the normal operation is to include at least four such sample bottles 94. The tool is then lowered via a wireline 14 through the borehole 12 and is landed opposite a formation which is desired to be tested. Upon command from the surface, the electronic section 16 activates the hydraulic pump 44 to start reciprocation of the mud pump piston 52. The reciprocal motion of the piston 52 draws fluid through the conduit 174 from the opening 172 in the exterior of the tool to the filter section 158.

Figure 10:
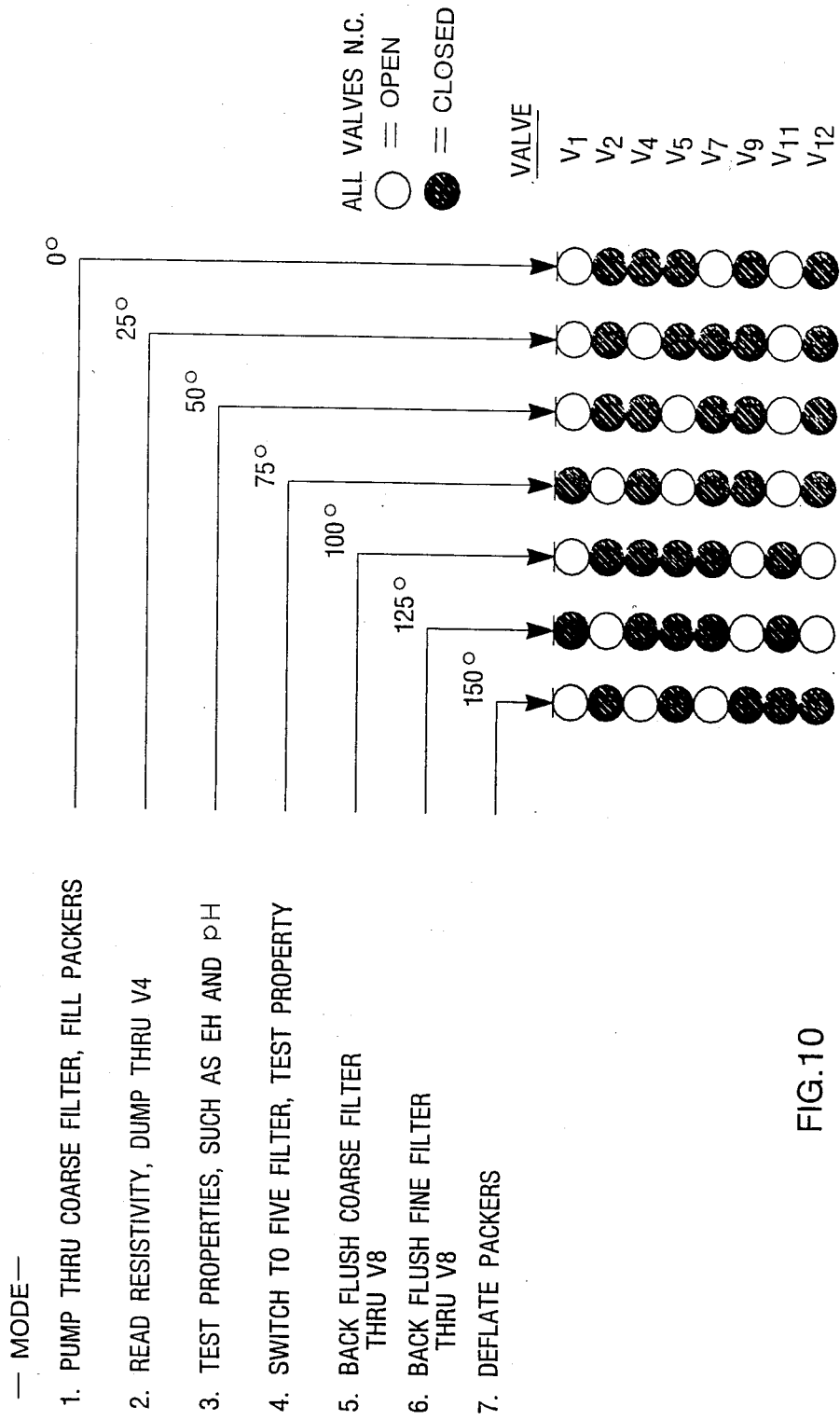
FIG. 10 is a logic table for controlling fluid flow in one embodiment of the present invention.

As shown in the logic table in FIG. 10, the Jacquard controller has at least seven modes or functions which will each be described below. When placed in Mode 1, only valves $V_1$, $V_7$ and $V_{11}$ are open by the engagement of the control members 129A and 129B with the valve stems 146 of those valves. Fluid flows through the conduit 174, through the coarse filter 160, into conduit 150, and through valve $V_1$. The fluid then passes through T connection $T_1$ and $T_2$ through valve $V_{11}$, through conduit 64 into and out of the mud pump 56. Filtered fluid then passes through conduit 66, through T connectors $T_5$ and $T_7$, through valve $V_7$ to conduit 152 to the packers 170 to inflate them. The packers are maintained in an inflated condition by valves $V_7$ and $V_9$ which are closed in Mode 2. To provide an indication of the pressure in the packers, a pressure transducer 184 is connected to T connector $T_8$ in the controller and mud valve section 120, and is in electrical communication with the electronics section 16.

After the packers have been inflated, as indicated by the transducer 184, the operator then activates the Jacquard control system. The cylinder 122 and piston 126 are contracted by operation of $JV_1$ and rotate 25° to Mode 2 by operation of the stepper 136/138 whereafter the cylinder 122 and piston 126 are expanded. In Mode 2, only valves $V_1$, $V_4$ and $V_{11}$ are open to allow fluid to pass past the resistivity section 72, and dump the fluid through valve $V_4$ above the packers.

The indication of the fluids resistivity is provided to the operator. When an indicated change in resistivity occurs, this can indicate that borehole fluid has been removed and uncontaminated formation fluid is being withdrawn into the tool. The Jacquard control system is then reactivated and changed to Mode 3 where valves $V_1$, $V_5$ and $V_{11}$ are open. The withdrawn fluid is passed across the probes 116 and 118 and the indications of the measured properties are transmitted to the surface. If the operator desires, a sample of this fluid is then taken by the operation of a valve ($BV_{1-4}$) to drive the respective pin 110 to puncture the seal 102 on the desired sample bottle 94. Fluid is drawn into the interior of the bottle 94 and is maintained there under ambient reservoir pressure by the valve 100 in the throat portion 96 of the bottle 94. If additional samples ar to be taken, then the remaining valves ($BV_{1-4}$) are activated as previously described. After uncontaminated fluid is being withdrawn, it is preferable to pass the fluid through the fine filter 162 prior to being tested and sampled. In this case, the Jacquard control system is activated and moved to Mode 4 wherein valves $V_2$, $V_5$ and $V_{11}$ are open.

All withdrawn fluid passes over the filters 160/162 and in the event that the filters 160 and/or 162 become fouled with solids, the tool will become disabled. The tool is provided with two modes, Modes 5 and 6, to clean the filters, wherein the pressurized fluid in the packers is released and back flushes the filters 160/162 to discharge any accumulated solids and other material through vent valve $V_8$ out of the tool.

The packers can be reinflated by returning to Mode 1 and thereafter, if all work desired at that depth in the wellbore has been completed, the packers can be deflated by activation of the Jacquard control system to Mode 7. The tool can then be moved to another position and the process repeated.

By inclusion of additional valves in the Turrets 1 and 2 (FIGS. 6 and 7B), additional functions can be added to the tool apart from those disclosed herein. One advantage of the Jacquard control system of the present invention is that should the operator cause the system to skip modes or move backwards, no redundant valve opening occurs. The selection of the modal position is independent from the operation of the valves and therefore, inadvertent contamination is avoided.

Whereas the present invention has been described in particular relation to the drawings attached hereto, it should be understood that other and further modifications, apart from those shown or suggested herein, may be made within the scope and spirit of the invention.

What I claim is:

1. A system for controlling fluid flow in a device, comprising:

at least one control member having a plurality of holes therein, the holes being arranged in a plurality of patterns associated with desired functions of the device, the at least one control member cooperable with means for permitting fluid flow within the device to carry out the desired functions; and means to selectively adjust the relative position of the at least one control member to the means for permitting fluid flow to carry out the desired functions.

2. The system of claim 1 wherein the means for permitting fluid flow comprises a plurality of mechanically activated valves.

3. The system of claim 1 wherein the at least one control member comprises:

a cylinder having a piston disposed therein for reciprocal movement, at least one planar member mounted to the piston perpendicularly to the longitudinal axis thereof, and the at least one planar member having the plurality of holes therein.

4. The system of claim 3 and including a second planar member mounted to the cylinder perpendicularly to the longitudinal axis thereof, the second planar member including a second plurality of holes therein.

5. The system of claim 3 wherein the at least one planar member is circular.

6. A system of claim 3 wherein the means to selectively adjust the position of the at least one control member comprises:

fluid means for moving the piston reciprocally within the cylinder, and means for rotating the at least one control member about its longitudinal axis.

7. An apparatus for testing fluid from a subterranean formation traversed by a borehole, comprising:

a body member for suspension within a borehole;

means connected to the body member for withdrawing fluid from the subterranean formation;

testing means connected to the body member for determining at least one property of the withdrawn fluid;

means in operative communication with the testing means for providing an indication of the at least one property of the withdrawn fluid to a remote location;

at least one control member having a plurality of holes therein, the holes being arranged in a plurality of patterns associated with desired functions of the device, the at least one control member cooperative with means for permitting fluid flow within the device to carry out the desired functions within the body member; and means to selectively adjust the relative position of the at least one control member to the means for permitting fluid flow.

8. The apparatus of claim 7 wherein the means for withdrawing fluid includes a suction plate releasably engageable with the borehole surface for withdrawing fluid from the subterranean formation.

9. The apparatus of claim 7 wherein the at least one property of the withdrawn fluid to be determine is selected from the group comprising EH, pH, temperature, pressure, and resistivity and fluid flow rate.

10. The apparatus of claim 7 wherein the means for providing an indication of the predetermined property transmits the indication to the remote location by means selected from the group consisting of mud pulse, fiber optics, radio frequency transmission, electrical pulse, and combinations of these.

11. The system of claim 7 wherein the at least one control member comprises a cylinder having a piston disposed therein for reciprocal movement, at least one planar member mounted to the piston perpendicularly to the longitudinal axis thereof, and the at least one planar member including the plurality of holes therein.

12. The system of claim 11 and including a second planar member mounted to the cylinder perpendicularly to the longitudinal axis thereof, the second planar member having the second plurality of holes therein.

13. The system of claim 11 wherein the at least one planar member is circular.

14. The system of claim 11 wherein the means to selectively adjust the position of the at least one control member comprises fluid means for moving the piston reciprocally within the cylinder, and means for rotating that at least one control member about its longitudinal axis.

15. The apparatus of claim 11 and including a plurality of normally closed mechanically actuated valves in fluid communication with fluid passageways within the body member, each of the mechanically actuated valves including a valve stem of a smaller outside diameter than the inside diameter of the holes, and the mechanically actuated valves being disposed so that, depending upon the orientation of the control member with respect to the fluid passageways, certain valve stems are depressed by the at least one control member to effectuate fluid flow while certain other valve stems extend into the holes continuing to prevent fluid flow therethrough.

16. The apparatus of claim 7 and including means to equalize the fluid pressure outside of and inside of the body member while suspended in the borehole.

17. The apparatus of claim 7 wherein the body member comprises an elongated cylinder.

18. The apparatus of claim 7 wherein the means for withdrawing fluid includes packer means releasably engageable with the borehole surface and pump means for withdrawing fluid from the borehole and providing such fluid to fluid passageways.

19. The apparatus of claim 18 wherein the packer means is removable from the body member.

20. The apparatus of claim 7 and including means connected to the body member for selectively retaining a sample of the withdrawn fluid.

21. The apparatus of claim 20 wherein the means for selectively retaining a sample comprises at least one removable sample bottle.

22. The apparatus of claim 21 wherein the at least one sample bottle is detachably mounted to the exterior of the body member.

23. The apparatus of claim 21 wherein the at least one sample bottle includes valve means for preventing leakage of withdrawn fluid therefrom.

24. The apparatus of claim 23 wherein the at least one sample bottle is in an evacuated state prior to introduction of withdrawn fluid.

25. An apparatus for testing fluid samples from a subterranean formation traversed by a borehole, comprising:
a cylindrical body member for suspension in the borehole;
pump means for withdrawing fluid from the subterranean formation;
packer means releasably engageable with the borehole surface for sealing an interval within the borehole;
testing means connected to the body member for determining at least one property of the withdrawn fluid;
means for providing an indication of the determined property to a remote location; and
Jacquard control means connected to the body member and in operative contact with groups of fluid control valves for controlling the routing of fluid within the body member to carry out a desired function within the body member.

26. The apparatus of claim 25 and including sampling means connected to the body member for selectively retaining a sample of the withdrawn fluid.

27. A method of testing fluid samples from a subterranean formation, comprising:
(a) providing a body member within a borehole, the body member including a fluid control system comprising at least one control member having a plurality of holes therein, the holes being arranged in a plurality of patterns associated with desired functions of the body member, the at least one control member cooperable with means for permitting fluid flow within the body member to carry out the desired functions, and means to selectively adjust the relative position of the at least one control member to the means for permitting fluid flow;
(b) activating the means to selectively adjust the relative position of the at least one control member to accomplish the following tasks:
 (i) activating packers on the body member to seal an interval within the borehole;
 (ii) withdrawing fluid from the borehole interval; and
 (iii) determining at least one property of the withdrawn fluid; and
(c) providing an indication of the determined property to a remote location.

28. The method of claim 27 and including a step (f) comprising selectively retaining a sample of the withdrawn fluid.

29. A control system for controlling fluid flow in a device, comprising:
a cylinder having a piston disposed therein for reciprocal movement, at least one planar member mounted to the piston perpendicularly to the longitudinal axis thereof, the planar member hving a plurality of holes therethrough arranged in a plurality of patterns cooperable with fluid passageways connected to the device, each pattern of holes permitting fluid flow within the device to carry out desired functions; and
means to selectively adjust the relative position of the at least one planar member to the fluid passaageways to permit fluid flow to carry out the desired functions.

30. An apparatus for testing fluid from a subterranean formation traversed by a borehole, comprising:
a body member for suspension within a borehole;
means connected to the body member for withdrawing fluid from the subterranean formation;
testing means connect to the body member for determining at least one property of the withdrawn fluid;
means in operative communication with the testing means for providing an indication of the predetermined property to a remote location;
a cylinder having a piston disposed therein for reciprocal movement, at least one planar member mounted to the piston perpendicularly to the longitudinal axis thereof, the planar member having a plurality of holes therethrough arranged in a plurality of patterns cooperable with fluid passageways connected to the body member, each pattern of holes permitting fluid flow within the body member to carry out desired functions; and
means to selectively adjust the relative position of the at least one planar member to the fluid passageways to permit fluid flow to carry out the desired functions.

* * * * *